United States Patent [19]
Lamprecht

[11] 3,980,354
[45] Sept. 14, 1976

[54] WELDED-TOGETHER ROLLER BEARING

[75] Inventor: Horst Lamprecht, Oberwerrn, Germany

[73] Assignee: Kugelfischer Georg Schäfer & Co., Schweinfurt, Germany

[22] Filed: Sept. 17, 1974

[21] Appl. No.: 506,890

[30] Foreign Application Priority Data
Sept. 17, 1973 Germany............................ 2346679

[52] U.S. Cl.................................. 308/174; 308/216; 308/235; 308/184 R
[51] Int. Cl.².................... F16C 19/04; F16C 33/58
[58] Field of Search .......... 308/174, 175, 202, 212, 308/219, 214, 216, 235, 184 R

[56] References Cited
UNITED STATES PATENTS
3,420,589    1/1969    Green et al......................... 308/174

Primary Examiner—M. H. Wood, Jr.
Assistant Examiner—Richard A. Bertsch
Attorney, Agent, or Firm—Karl F. Ross; Herbert Dubno

[57] ABSTRACT

A roller bearing has a pair of metallic race members each formed with a machined race surface. Each of the members is formed with a relatively thin rib and the two members are joined together at the ends of the ribs by means of a weld. Thus stresses resulting from the welding operation are not transmitted to the machined race surfaces of the members.

6 Claims, 3 Drawing Figures

WELDED-TOGETHER ROLLER BEARING

FIELD OF THE INVENTION

The present invention relates to a roller bearing. More particularly this invention concerns such an assembly having a plurality of machined metallic race members which are secured together by welding.

BACKGROUND OF THE INVENTION

It is known to construct a roller bearing assembly of several independent parts, usually in the shape of rings. These parts are mounted together and secured relative to each other by means of welding so as to form an extremely rigid assembly that is relatively inexpensive to manufacture and at the same time unlikely to come apart as a result of vibration. In the fabrication of roller bearings, four different race surfaces are usually defined between the inner and outer races, with the outer race usually formed of two welded-together race members, one having two race surfaces and the other having a single race surface.

The principal disadvantage of such welded-together assemblies is that the very process of welding the parts together creates internal stresses in these parts which can distort the race surfaces. Obviously once the assembly is welded together it is impossible further to machine it so that either these distortions of the race surfaces must be accepted, or the assembly must be scrapped. Thus welded-together rolling rearings are generally inferior to those bearings which are not fabricated by welding.

It has been suggested to interconnect the various parts by just a few spot welds so to reduce the creation of internal stresses as much as possible. This is partially effective but produces relatively weak assemblies. In another known arrangement the various parts are made as massive as possible so as to minimize the effects of the local heating due to the welding operation. Such construction increases the bulk and cost of the assembly. Neither of these methods is fully effective, since even very small thermal stresses can distort the race surfaces and thereby make the bearing unacceptable.

OBJECTS OF THE INVENTION

It is therefore an object of the present invention to provide an improved roller bearing.

Another object is the provision of such an improved bearing which has welded-together race members.

SUMMARY OF THE INVENTION

These objects are attained according to the present invention in an improved roller-bearing raceway wherein each of the race members is formed with an elastic web region between the weld that interconnects these members and the respective race surface or surfaces on each member. Thus any stresses resulting from the welding operation will not be transmitted to the race surfaces because of the presence of the elastic web region which is interposed between these surfaces and the weld.

According to this invention each of the race members is formed with a respective rib which constitutes the elastic web region. This rib on each member is of substantially lesser cross-sectional thickness than the rest of the member and its outer edge is welded to the outer edge of a similar rib on the other member so that the thermal stresses induced by the welding operation will be confined to these ribs.

In accordance with the present invention the ribs are of substantially lesser cross-sectional area than the race members at the machine surfaces so as to minimize heat conduction and stress transmission from the weld to the surfaces. These ribs according to the present invention can extend axially or radially relative to the rotation axis of the bearing. According to the present invention they are simply formed by turning down the race members in the region of the surface to be welded so as to form such a rib. Thus a pair of oppositely facing registering grooves are formed at the plane of contact between the two rib members. These grooves lie between the respective race surfaces and the respective weld and serve to define the ribs.

In accordance with yet another feature of this invention the race members are formed with grooves at the weld so that the weld is recessed below the outer surface of the bearing and does not require subsequent machining-down.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
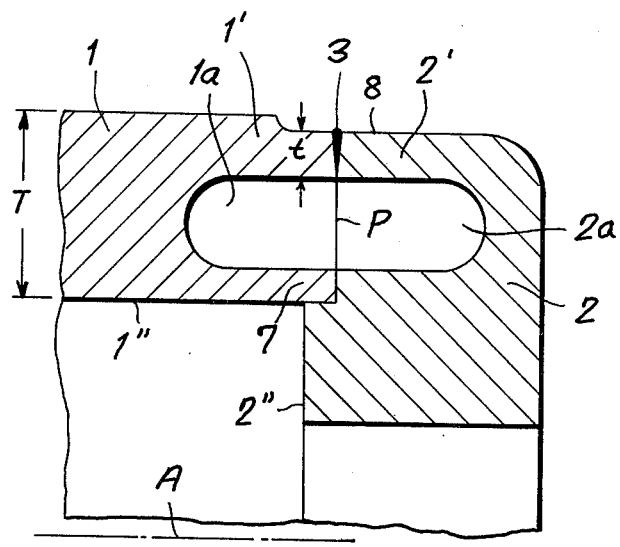
FIG. 1 is a section through a roller bearing raceway according to the present invention.

As shown in FIG. 1 a roller-bearing raceway has a pair of annular race members 1 and 2 formed of tool steel and adapted to rotate about an axis A. Each of the members 1 and 2 is formed with a respective annular rib 1' and 2' having an overall thickness $t$ which is substantially less than the thickness $T$ of either of the parts 1 or 2 and greater than the overall axial length $L$ of these ribs 1' and 2'. The ribs 1' and 2' extend parallel to the axis A and are joined together at a plane P by an annular weld 3. These ribs 1' and 2' are defined by a pair of grooves 1a and 2a which are turned into the respective members 1 and 2 and define the ribs 1' and 2' and separate them from the race surfaces 1'' and 2'' of the members 1 and 2. In addition the member 1 is formed with another rib 7 which prevents any of the material from weld 3 from running through to the surfaces 1'' and 2''. The surface 2'' is offset from the plane P. A shaft 9 is journaled in the bearing assembly with axial and radial roller bearings 11 and 10 engaging the surfaces 1'' and 2'''.

Figure 2:
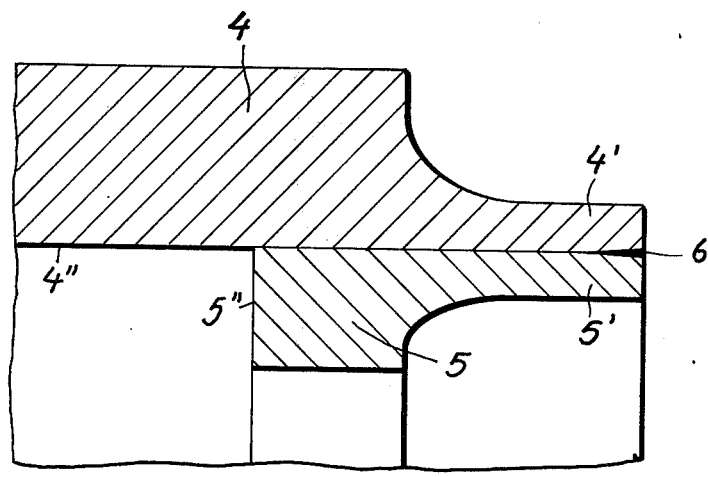
FIG. 2 is a similar section through another arrangement in accordance with this invention.
Figure 3:
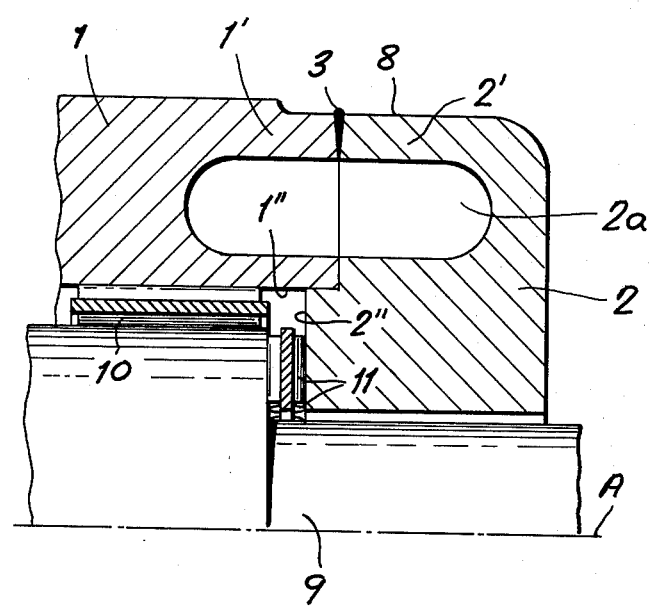
FIG. 3 is a view similar to FIG. 1 of the raceway with the bearings in place.

As shown in FIG. 2 a pair of members 4 and 5 having respective race surfaces 4'' and 5'' are formed with annular ribs 4' and 5' which extend parallel to the axis A but outwardly from the respective members 4 and 5. These ribs 4' and 5' are again of relatively thin cross-sectional area and are joined together by a weld 6. The ribs 4' and 5' are formed by turning down the two members 4 and 5 at their sides away from the surfaces 4'' and 5''.

As also shown in FIG. 1 the two members 1 and 2 are turned down externally as shown at 8 so that the weld 3 lies in a recess and does not project beyond the outer cylindrical surface defined by the member 1. Thus subsequent machining-down of the bearing assembly to smooth out the weld 3 is not required.

I claim:

1. A roller-bearing raceway comprising a pair of metallic race members each having machined race surfaces with a common rotation axis, a weld securing said race members together, and means including respective axially extending ribs on said members forming an elastic web region between said weld and the respective race surface, said ribs being of substantially less cross-sectional thickness than said members adjacent said surfaces, an axially open groove formed in each member defining the respective rib and lying between said weld and the respective race surface.

2. The raceway defined in claim 1 wherein said ribs are each substantially longer than they are wide.

3. The raceway defined in claim 1 wherein said ribs have end faces lying on a plane perpendicular to said axis.

4. The raceway defined in claim 3 wherein said weld is provided between said faces.

5. The raceway defined in claim 4 wherein said weld is provided between said ribs adjacent said faces.

6. The raceway defined in claim 1 wherein said members are formed with a recess, said weld being provided in said recess.

* * * * *